United States Patent [19]

Tauchi

[11] Patent Number: 5,350,996
[45] Date of Patent: Sep. 27, 1994

[54] METHOD AND CIRCUIT FOR CHARGING BATTERY OF PORTABLE APPARATUS

[75] Inventor: Takaaki Tauchi, Tokyo, Japan

[73] Assignee: NEC Corporation, Tokyo, Japan

[21] Appl. No.: 973,695

[22] Filed: Nov. 9, 1992

[30] Foreign Application Priority Data

Nov. 8, 1991 [JP] Japan ................................ 3-321310

[51] Int. Cl.⁵ ............................................ H02J 7/10
[52] U.S. Cl. .................................. 320/22; 320/20; 320/21; 320/39
[58] Field of Search ................................ 320/22–24, 320/21, 20, 39

[56] References Cited

U.S. PATENT DOCUMENTS

| | | | |
|---|---|---|---|
| 3,944,904 | 3/1976 | Hase | 320/21 X |
| 3,959,707 | 5/1976 | Stephens | 320/22 X |
| 4,670,703 | 6/1987 | Williams | 320/22 |
| 4,888,544 | 12/1989 | Terry et al. | 320/22 X |
| 5,130,634 | 7/1992 | Kasai | 320/22 |
| 5,140,251 | 8/1992 | Wu | 320/20 |

Primary Examiner—R. J. Hickey
Attorney, Agent, or Firm—Sughrue, Mion, Zinn, Macpeak & Seas

[57] ABSTRACT

A battery-power portable apparatus includes a first constant current source supplies a low current to a battery when the battery voltage is initially lower than a reference level, and when the reference level is reached a second constant current source takes over to supply a high charging current. The battery voltage is constantly monitored to detect a peak voltage and a subsequent voltage drop. When the battery voltage drops a predetermined amount from the peak voltage, the second constant current source is disabled, and the first constant current source is rendered active to charge the battery with a low current on an intermittent mode.

6 Claims, 4 Drawing Sheets

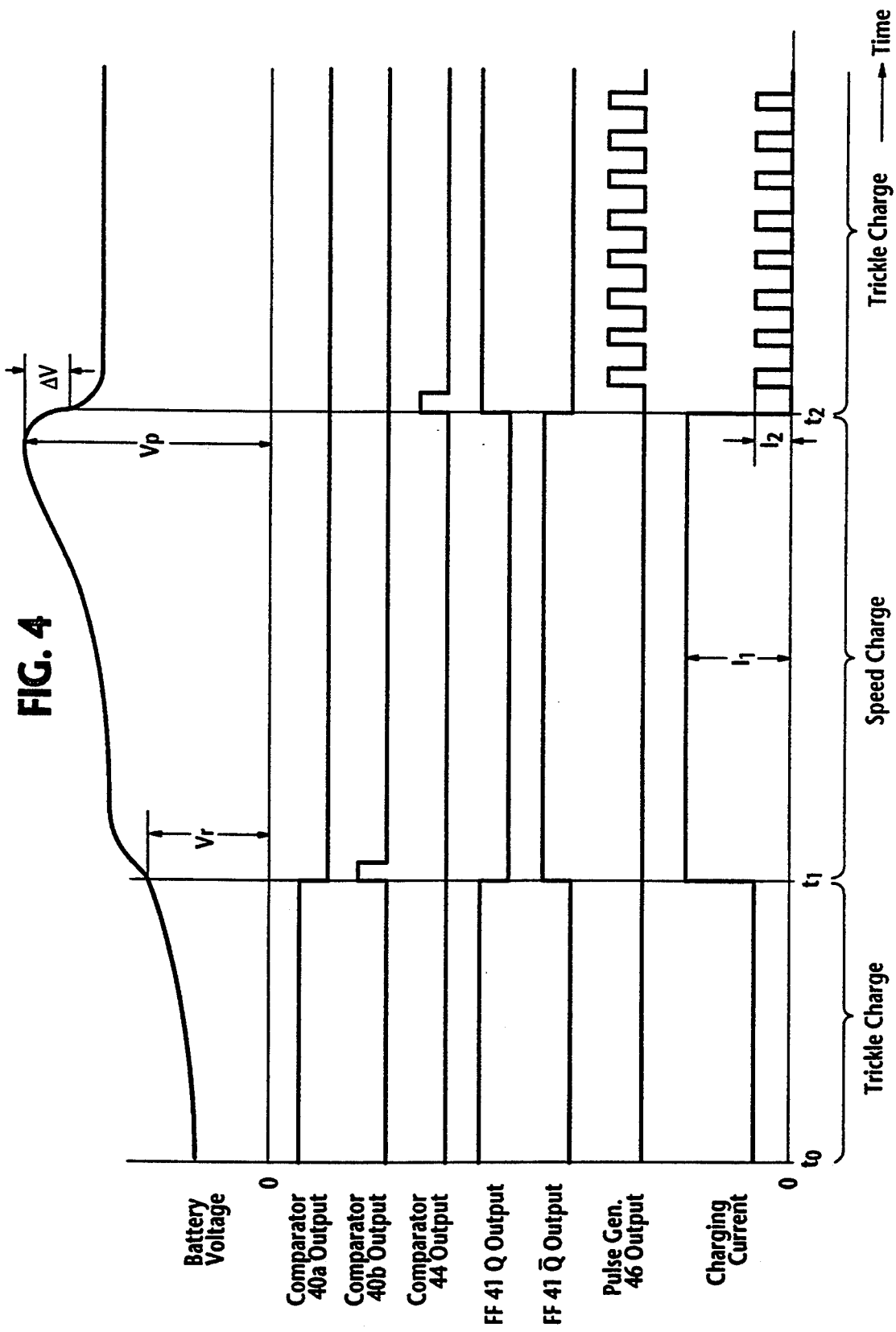

METHOD AND CIRCUIT FOR CHARGING BATTERY OF PORTABLE APPARATUS

BACKGROUND OF THE INVENTION

The present invention relates generally to battery chargers, and more specifically to a charging circuit for a battery-powered portable apparatus such as portable personal computers.

Prior art battery-powered apparatus such as portable personal computers are provided with an AC-DC converter or adapter for charging the rechargeable battery of the apparatus with commercial power. The prior art charging circuit includes a trickle charging circuit and a speed charging circuit. The trickle charging circuit is switched into circuit with the battery when the initial battery voltage is lower than a reference level, so that the battery is charged with a low current to gradually raise its voltage. This initial low current charging is to avoid a serious damage on the battery if the battery is charged when its voltage is too low. As the reference voltage is reached, the speed charging circuit is then switched into circuit with the battery to charge it with a high current for speed charging. As the battery voltage reaches a known peak value, the charging circuit terminates the speed charging mode and sets the trickle charging circuit again into operation, so that the battery is continuously charged with a low current. This trickle charging mode is continued until the AC-DC adapter is disconnected from the apparatus.

One problem inherent in the prior art is that, if the AC-DC adapter remains connected to the apparatus, the trickle charging mode is indefinitely continued, and will cause an overcharging of the battery, which will result in a shortening of the battery's lifetime.

SUMMARY OF THE INVENTION

The overcharging problem resulting from continuous trickle charging of a rechargeable battery is avoided in accordance with the present invention by periodically interrupting the trickle charging current after speed charging mode is performed.

More specifically, the voltage of the battery is monitored and if it is higher than a reference value, the battery is charged with a high current for a period of time for speed charging. Following the speed charging mode, the battery is intermittently charged with a low current.

The present invention provides a method and a circuit for charging a rechargeable battery using a DC voltage source using a first constant current source for producing a low current and a second constant current source for producing a high current. The first constant current source is caused to supply the low current to the battery when its voltage is lower than a reference level, and the second constant current source is then caused to supply the high current to the battery for a period of time after the battery voltage becomes higher than the reference level. The first constant current source is again caused to intermittently supply the low current upon termination of that period.

BRIEF DESCRIPTION OF THE DRAWINGS

The present invention will be described in further detail with reference to the accompanying drawings, in which:

FIG. 4 is a timing diagram associated with the circuit of FIG. 3.

DETAILED DESCRIPTION

Figure 1:
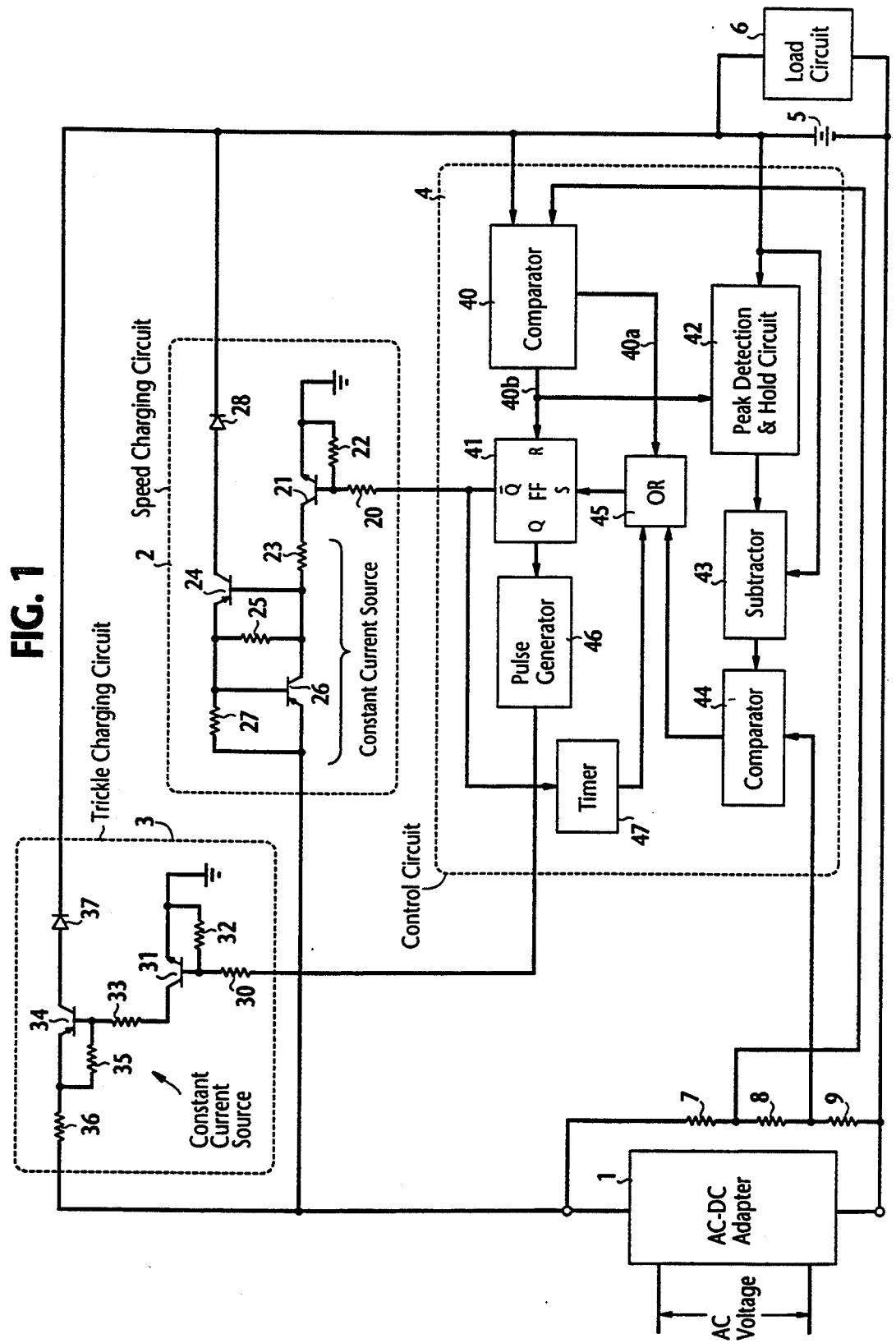
FIG. 1 is a circuit diagram of a battery charging circuit of the present invention for a battery-powered portable apparatus.

In FIG. 1, there is shown a battery charging circuit according to the present invention which is incorporated in a battery-powered apparatus such as portable personal computer. When the apparatus is used in an office or home, an AC-DC converter, or adapter 1 is connected to a commercial outlet to supply a rated DC voltage to the apparatus. The apparatus includes a speed charging circuit 2 and a trickle charging circuit 3 which are connected to a built-in rechargeable battery 5, such as nickel cadmium battery. The battery voltage is monitored by a charging control circuit 4 that switchably controls the charging circuits 2 and 3 to recharge the battery 5. The electronic circuitry of the apparatus is indicated as a load circuit 6 to receive DC power from the rechargeable battery 5.

A series of resistors 7, 8 and 9 is connected across the terminals of DC voltage source 1 to produce a reference voltage Vr at a junction between resistors 7 and 8 and a reference voltage $\Delta V$ at a junction between resistors 8 and 9.

Control circuit 4 includes a comparator 40 which monitors the battery voltage by comparing it with the reference voltage Vr and produces a logic-1 level output on lead 40a when the battery is lower than the reference voltage and a logic-1 pulse on lead 40b at the moment the battery voltage rises above the reference voltage. The output of comparator 40 on lead 40a is applied to an OR gate 45 the output of which is connected to the set input of a flip-flop 41. The output lead 40b of comparator 40 is coupled to the reset input of flip-flop 41. The true output of flip-flop 41 is connected to a pulse generator 46 which drives the trickle charging circuit 3 and the complementary output is connected to the speed charging circuit 2.

Further included in the control circuit 4 is a peak detection and hold circuit 42, or simply a peak detector which is reset in response to the comparator output on lead 40b to start monitoring the battery voltage to detect a peak voltage Vp. When the battery 5 is charged with a current from speed charging circuit 2, its voltage will rapidly rise with time. Due to the unique characteristics of the rechargeable battery 5, there is a voltage drop immediately after it attains a peak voltage Vp, which is detected and held by peak detector 42 until it is reset by comparator 40. A subtractor 43 is connected to the output of peak detector 42 to detect a difference between the peak voltage and the instantaneous value of the battery voltage and produce a signal indicative of the detected voltage difference. The output of subtractor 43 is input to a comparator 44 where it is compared with a reference voltage $\Delta V$ obtained at a junction between resistors 8 and 9. Comparator 44 feeds an output signal to OR gate 45 when the difference signal from subtractor 43 exceeds the reference voltage $\Delta V$.

Speed charging circuit 2 is made up of a switching circuit and a constant current source. The switching circuit includes a resistor 20 through which the output of flip-flop 41 is applied to the base of an npn transistor 21 whose emitter is coupled to ground. The base of transistor 21 is further grounded through a resistor 22. The constant current source of the speed charging circuit includes a resistor 23 through which the collector of transistor 21 is connected to the base of a pnp transistor 24 and the collector of a pnp transistor 26 whose base is coupled to the emitter of transistor 24. The base and emitter of each transistor 24 and 26 are connected by a resistor 25 and a resistor 27, respectively. The emitter of transistor 26 is connected to the positive terminal of DC voltage source 1 and the collector of transistor 24 is connected through a diode 28 to the positive terminal of battery 5. When transistor 21 is turned on in response to the logic-1 input from flip-flop 41, transistors 24 and 25 jointly operate to produce a current of relatively high value $I_1$, which is supplied through diode 28 to the battery 5, so that the latter is rapidly charged.

Trickle charging circuit 3 comprises a switching circuit and a constant current source. The switching circuit of the charging circuit 3 includes a resistor 30 through which the output of pulse generator 46 is input to the base of an npn transistor 31 whose emitter is grounded, with a resistor 32 being coupled between the base and emitter of transistor 31. The constant current source of charging circuit 3 is formed by a single pnp transistor 34 whose base is connected by a resistor 33 to the collector of switching transistor 31. The emitter of transistor 34 is connected to its base by a resistor 35 and to the positive terminal of the DC voltage source 1 through resistor 36. Transistor 31 is turned on and off in response to the periodic pulses from pulse generator 46 to cause the constant current source transistor 34 to periodically supply currents of constant value $I_2$ lower than $I_1$ to the battery 5 though a diode 37. In this way, the battery 5 is periodically trickle-charged following the speed charging operation.

If the voltage drop is not detected for some reason, speed charging will continue indefinitely and cause a damage on the battery. To prevent this problem, a timer 47 is connected to the complementary output of flip-flop 41 to measure the length of time in which the battery is charged on the speed charging mode. Timer 47 produces an output when the measured time exceeds a predetermined value and applies this signal to OR gate 45.

Figure 2:
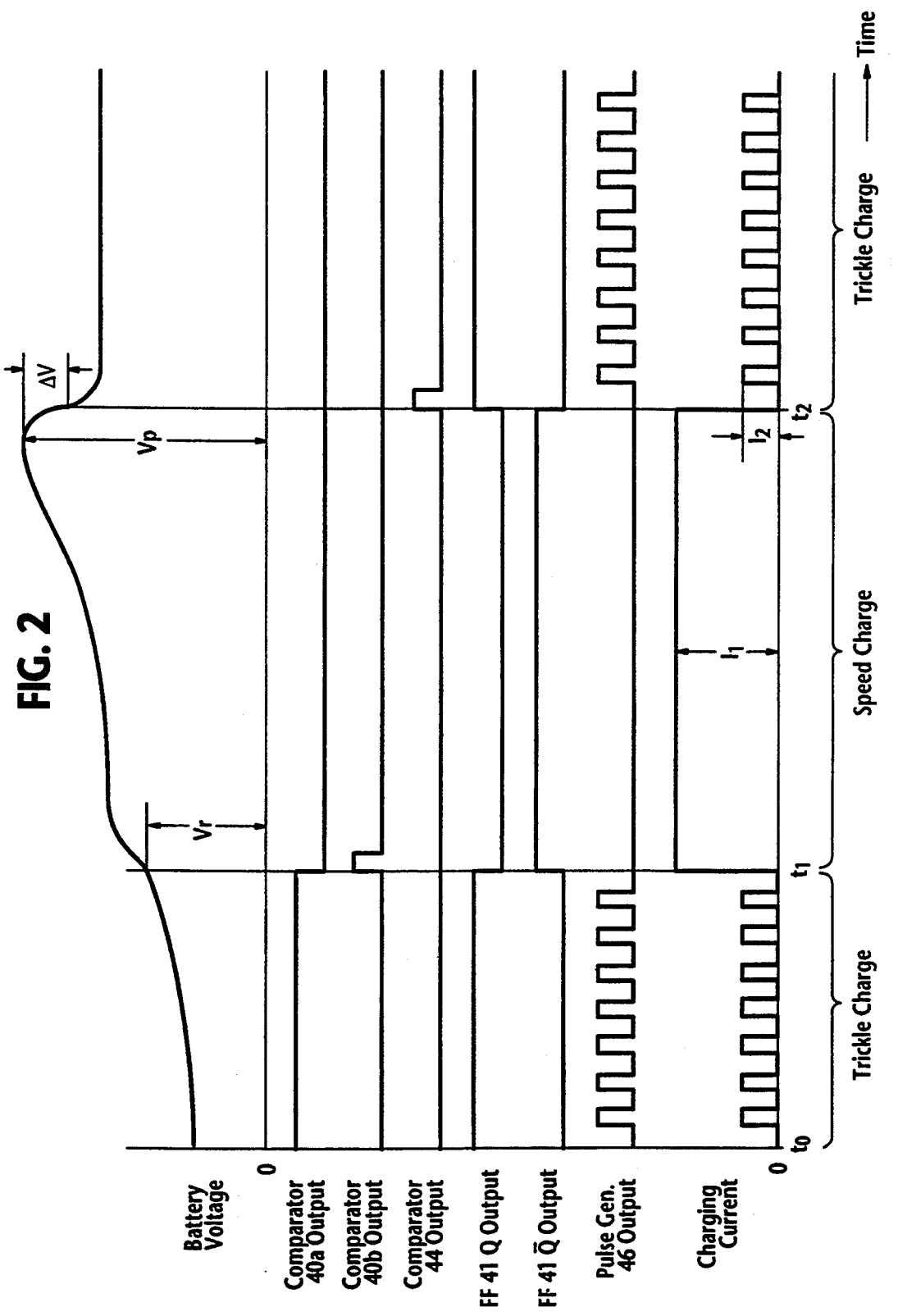
FIG. 2 is a timing diagram associated with the circuit of FIG. 1.

The operation of the battery charging circuit of this invention is visualized in FIG. 2. If the apparatus is used on a battery-powered mode, the battery voltage may be lower than the reference voltage Vr at the time the adapter 1 is connected to the commercial outlet at time $t_0$. Comparator 40 generates a logic-1 output on lead 40a to set the flip-flop 41 to produce a logic 1 at the true output of flip-flop 41, thus enabling the pulse generator 46 to intermittently drive the trickle charging circuit 3, so that the battery voltage will rise gradually. As it reaches the reference voltage Vr at time $t_1$, comparator 40 produces a logic-0 level output on lead 40a to reset the flip-flop 41, disabling the pulse generator 46 to terminate the trickle charging mode. Simultaneously, comparator 40 produces a logic-1 pulse on lead 40b to reset the flip-flop 41 to produce a logic 1 at the complementary output of the flip-flop to initiate a speed charging, so that the battery is charged with current $I_1$ and its voltage rises rapidly until it reaches the peak level Vp. When the battery voltage drops by $\Delta V$ from the peak value at time $t_2$, comparator 44 produces an output pulse which sets the flip-flop 41. Thus, the complementary output of flip-flop 41 switches to logic 0, terminating the speed charging, and the true output enables the pulse generator 46 again to intermittently drive the trickle charging circuit 3 to charge the battery with current pulses of reduced value.

Figure 3:
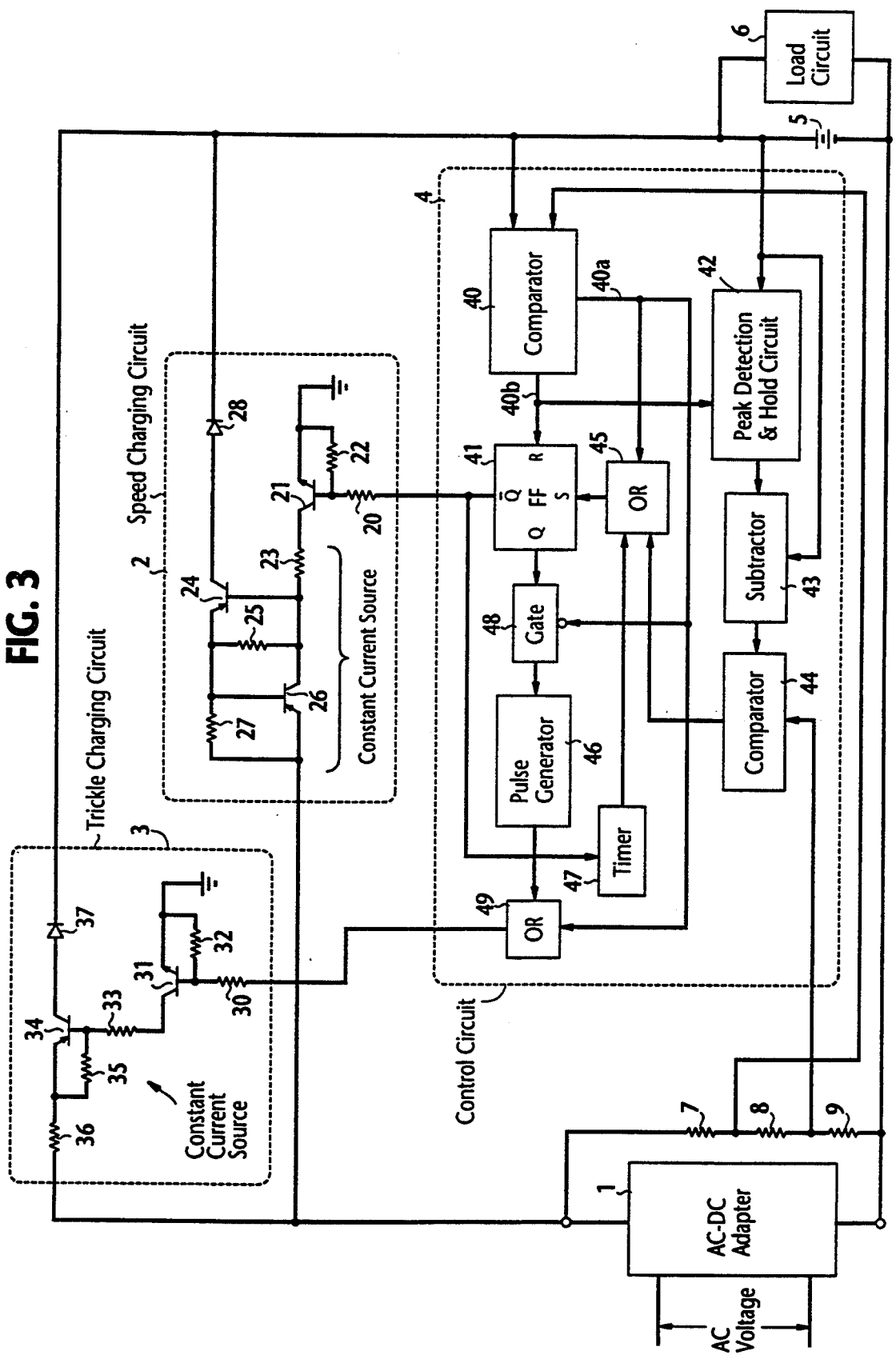
FIG. 3 is a circuit diagram of a modified embodiment of the present invention.

The embodiment of FIG. 1 is modified as shown in FIG. 3 in which the trickle charging mode prior to speed charging is not interrupted since it does not usually continue in a manner as the trickle charge that follows the speed charging. Thus, it is preferable to provide a continuous trickle charging mode prior to speed charging mode. In this modification, the output of comparator 40 on lead 40a is applied as a control signal to an inhibit gate 48 and to an OR gate 49 whose output is connected to the trickle charging circuit 3. The inhibit gate 48 is connected between the true output of flip-flop 41 and the input of pulse generator 46. The output of pulse generator 46 is connected to OR gate 49.

As shown in FIG. 4, when the battery is lower than the reference voltage Vr, comparator output on lead 40a causes flip-flop 41 to produce a logic 1 at the true output terminal, but kept from being applied to pulse generator 46. This logic-1 output is applied through OR gate 49 to trickle charging circuit 3 to cause it to draw a constant, low current in a continuous mode into the battery 5. The latter is thus continuously charged with low current $I_2$ until it attains the reference level to trigger the comparator 40 to produce an output on lead 40b to provide speed charging by resetting flip-flop 41. When a voltage drop $\Delta V$ is detected by comparator 44, flip-flop 41 is set, producing a true output which is coupled through gate 48 to pulse generator 46 to cause it to supply periodic pulses through OR gate 49 to the trickle charging circuit in a manner as in the previous embodiment.

What is claimed is:

1. A circuit arrangement for charging a rechargeable battery using a DC voltage source, comprising:
  a first constant current source connected between said DC voltage source and said battery for producing a current of low value;
  a second constant current source connected between said DC voltage source and said battery for producing a current of high value;
  means for detecting battery voltage; and
  control means responsive to the detected battery voltage for causing said first constant current source to supply the current of low value to said battery when the voltage of said battery is lower than a reference level, causing said second constant current source to supply said current of high value to said battery for a period of time after the voltage of the battery becomes higher than said reference level, and causing said first constant current source to intermittently supply said current of low value upon termination of said period.

2. A circuit arrangement as claimed in claim 1, wherein said battery voltage detecting means comprises means for detecting a peak voltage developed by said battery, and means for detecting when the voltage of the battery drops by a predetermined amount from said peak voltage to terminate said period.

3. A circuit arrangement as claimed in claim 1, wherein said control means comprises means for causing said first constant current source to intermittently supply the current of low value to said battery when the voltage of said battery is lower than said reference level.

4. A portable apparatus having a battery, said apparatus being powered by an AC-DC adapter, the apparatus comprising:
- a first constant current source connected between said AC-DC adapter and said battery for producing a current of low value;
- a second constant current source connected between said AC-DC adapter and said battery for producing a current of high value;
- first detector means for detecting when the voltage of said battery drops below a reference level to produce a first detector output;
- second, peak detector means detecting a peak voltage developed by said battery;
- third detector means for detecting when said battery drops by a predetermined amount from said peak voltage to produce a third detector output;
- first charge control means responsive to said first detector output for causing said first constant current source to supply said current of low value to said battery, and responsive to said third detector output for causing said first constant current source to intermittently supply said current of low value to said battery; and
- second charge control means responsive to the absence of said first detector output for causing said second constant current source to supply said current of high value to said battery and responsive to said third detector output for disabling said second constant current source.

5. A portable apparatus as claimed in claim 4, wherein said first charge control means includes means for causing said first constant current source to intermittently supply said current of low value to said battery in response to said first detector output.

6. A portable apparatus as claimed in claim 4, wherein said first charge control means includes a timer for detecting when said second constant current source supplies the current of high value to said battery for a period exceeding a predetermined amount of time and generating a timer output as said first detector output.

* * * * *